(12) United States Patent
Moyal et al.

(10) Patent No.: US 12,356,275 B2
(45) Date of Patent: Jul. 8, 2025

(54) GEOFENCING AND CONTEXT BASED SENSOR SELF-CONFIGURATION

(71) Applicant: INTERNATIONAL BUSINESS MACHINES CORPORATION, Armonk, NY (US)

(72) Inventors: Shailendra Moyal, Pune (IN); Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 17/654,619

(22) Filed: Mar. 14, 2022

(65) Prior Publication Data
US 2023/0292080 A1 Sep. 14, 2023

(51) Int. Cl.
*H04W 4/021* (2018.01)
*H04W 4/38* (2018.01)

(52) U.S. Cl.
CPC ............. *H04W 4/021* (2013.01); *H04W 4/38* (2018.02)

(58) Field of Classification Search
CPC ....... H04W 48/02; H04W 48/04; H04W 8/18; H04L 1/0002
USPC ...................................................... 455/456.1
See application file for complete search history.

(56) References Cited

U.S. PATENT DOCUMENTS

| 8,838,138 | B2 | 9/2014 | Modali |
| 2010/0017126 | A1 | 1/2010 | Holcman |
| 2019/0149949 | A1* | 5/2019 | Kumar ................. H04W 4/023 455/456.1 |
| 2020/0336861 | A1* | 10/2020 | McCutchin ............ H04W 4/35 |
| 2022/0276061 | A1* | 9/2022 | Viitala ............... G06Q 10/0833 |

OTHER PUBLICATIONS

Campos et al., "Autonomic Context-Aware Wireless Sensor Networks", https://www.hindawi.com/journals/is/2015/621326/, Hindawi Publishing Corporation, Journal of Sensors, Apr. 21, 2015, vol. 2015, Article ID 621326, pp. 1-15.
Gamez et al., "Configuring a Context-Aware Middleware for Wireless Sensor Networks", https://www.mdpi.com/1424-8220/12/7/8544, Sensors, 2012, 12, pp. 8544-8570.

(Continued)

*Primary Examiner* — Ahmad F. Matar
*Assistant Examiner* — Jirapon Tulop
(74) *Attorney, Agent, or Firm* — Tihon Poltavets

(57) ABSTRACT

A method for managing self-configuration of sensors based on geofencing and context awareness includes determining a position for each object from a plurality of objects within a location. The method also includes segmenting the plurality of objects based on a plurality of parameters, where each parameter provides context to each object and at least one sensor on each object with respect to the location. In response to determining a plurality of geofence areas for the segmentation of the plurality of objects, the method also includes determining a plurality of sensor configurations for the plurality of objects, wherein each sensor configuration is for the at least one sensor on each object. In response to determining an action is performable based on a first sensor configuration from the plurality of sensor configurations, the method also includes performing the first sensor configuration on a first object from the plurality of objects.

20 Claims, 6 Drawing Sheets

(56) References Cited

OTHER PUBLICATIONS

Mell et al., "The NIST Definition of Cloud Computing", National Institute of Standards and Technology, Special Publication 800-145, Sep. 2011, pp. 1-7.
Pathan et al., "On Self-Configuration of Sensor Network Services", https://ieeexplore.ieee.org/document/5766652, The 8th Annual IEEE Consumer Communications and Networking Conference—Work in Progress (Short Papers), 2011 IEEE, pp. 1-2.

* cited by examiner

GEOFENCING AND CONTEXT BASED SENSOR SELF-CONFIGURATION

BACKGROUND

This disclosure relates generally to geofencing and in particular to, managing self-configuration of sensors based on geofencing and context awareness.

In a wireless sensor network, various types of sensors gather data for monitoring devices, equipment, or machinery positioned in an industrial setting. The sensors gather data that is analyzed and assist with automated processes in the industrial setting. It is common for multiple objects (e.g., piping system and solder oven) in the industrial setting to each include a common and interchangeable sensor. A geofence is a virtual perimeter that defines a geographical area utilizing positioning devices and networks, such as, global positioning systems (GPS), radio-frequency identification (RFID), wireless networking technology, or cellular data. The virtual perimeter, also referred to as a virtual fence, can be stationary or nonstationary depending on an application, where a stationary virtual fence is associated with a physical location and a nonstationary virtual fence is associated with a device.

SUMMARY

Embodiments in accordance with the present invention disclose a method, computer program product and computer system for managing self-configuration of sensors based on geofencing and context awareness, the method, computer program product and computer system can determine a position for each object from a plurality of objects within a location. The method, computer program product and computer system can segment the plurality of objects based on a plurality of parameters, wherein each parameter provides context to each object and at least one sensor on each object from the plurality of objects with respect to the location. The method, computer program product and computer system can, responsive to determining a plurality of geofence areas for the segmentation of the plurality of objects, determine a plurality of sensor configurations for the plurality of objects, wherein each sensor configuration is for the at least one sensor on each object from the plurality of objects. The method, computer program product and computer system can, responsive to determining an action is performable based on a first sensor configuration from the plurality of sensor configuration, perform the first sensor configuration on a first object from the plurality of objects.

DETAILED DESCRIPTION

Embodiments of the present invention manage self-configuration of sensors based on geofencing and context awareness. In an industrial setting, such as a warehouse or manufacturing facility, embodiments of the present invention determine a position for various objects with multiple integrated sensors and segment the various objects based on associated context. The associated context includes activities performable by each object from the various objects, a type of object (e.g., machinery, electronic device, supporting infrastructure) for each of the various objects, sensors installed on each of the various objects, and/or whether each of the various objects is stationary or mobile within the industrial setting. Based on the segmentation, embodiments of the present invention geofence areas for the various objects and determine sensor configurations for each sensor of each object in a geofenced area. Utilizing the sensor configurations, embodiments of the present invention monitor the geofenced areas and determine whether a new object, a new sensor, and/or an existing object breached a geofenced area. In response to determining a new object, a new sensor, and/or an existing object breaches a geofenced area, embodiments of the present invention configure the new sensor, sensors on the new object, and/or sensors on the existing object that breached the geofences area based on an available sensor configuration. Embodiments of the present invention provide improvements to integrating new hardware within the supply chain, particularly various configurable sensors for collecting operation data for machinery, electronic devices, and supporting infrastructure in a warehouse or manufacturing facility. Providing self-configuration of sensors based on geofencing and context awareness allows for accelerated transitions and decreased downtime for machinery, electronic devices, and supporting infrastructure in the warehouse or manufacturing facility.

Figure 1:
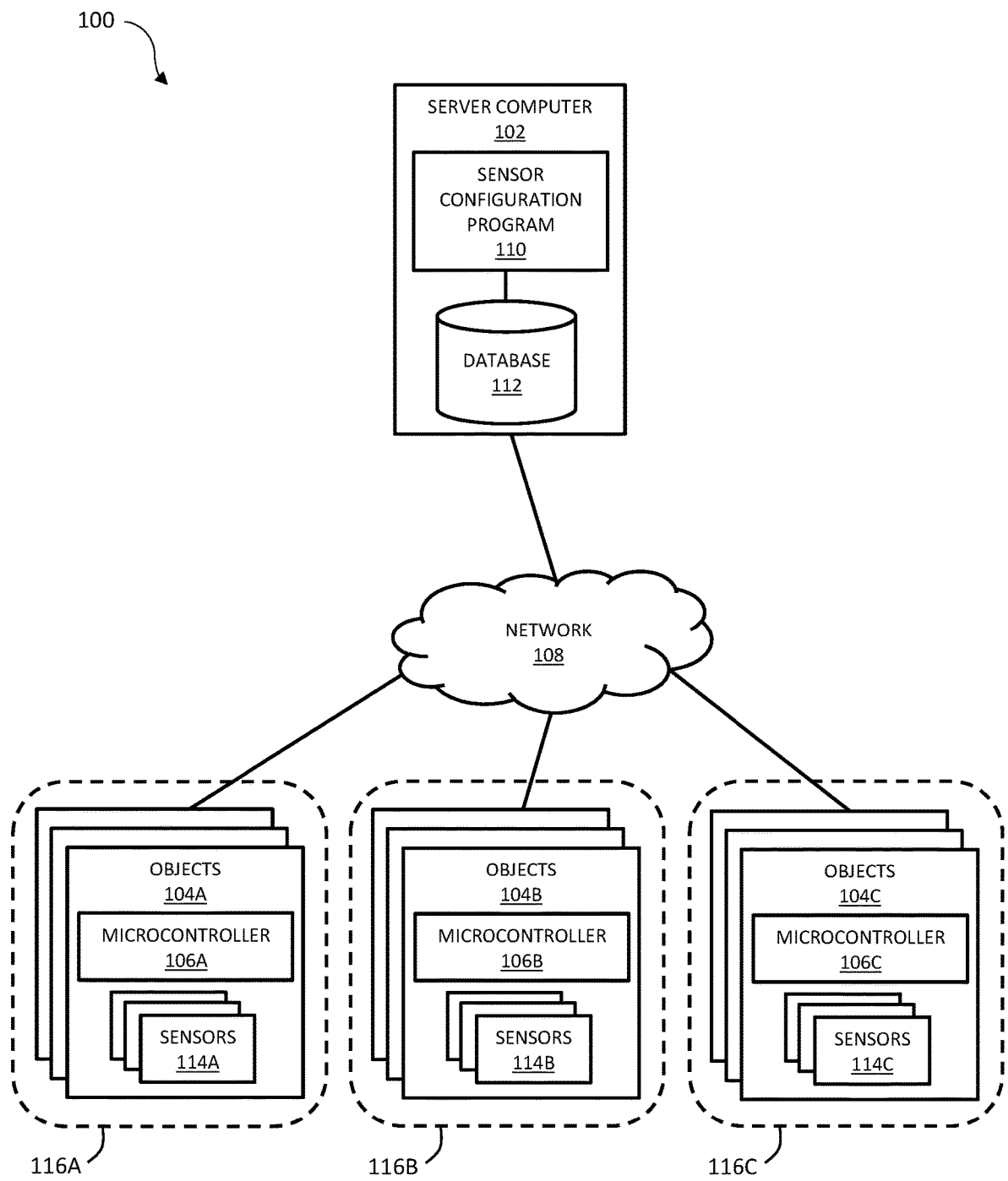
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Server computer 102 may be a desktop computer, a laptop computer, a tablet computer, a specialized computer server, a smartphone, or any computer system capable of executing the various embodiments of sensor configuration program 110. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information. Server computer 102 includes sensor configuration program 110 for managing sensor configuration based on geofencing of objects in an industrial setting and database 112.

Objects 104A, 104B, and 104C represent various items in an industrial setting, such as a warehouse or manufacturing facility, with respective integrated microcontrollers 106A, 106B, and 106C and sensors 114A, 114B, and 114C. For discussion proposes, a single object is designated object 104, a single microcontroller is designated microcontroller 106, and multiple sensors associated with object 104 and microcontroller 106 is designated sensors 114. Object 104 can be an electronic device, a machine, or infrastructure within the industrial setting and integrated microcontroller 106 allows for object 104 to communicate with various components and devices within distributed data processing environment, via network 108. An electronic device represents a tool with an electrical power source in the industrial setting that includes integrated microcontroller 106 and sensors 114, such as, an electrical drill or a digital torque wrench. A machine represents a physical system in the industrial setting for performing an action utilizing power to apply forces and control movements that includes integrated microcontroller 106 and sensors 114, such as, a cleat machine or belt conveyor system. Infrastructure represents systems for supporting sustainable functionality of electronic devices and machines at the industrial setting that includes integrated microcontroller 106 and sensors 114, such as, piping for server cooling systems or heat, ventilation, and air conditioning (HVAC) componentry. Sensor configuration program 110 segments objects 104 and determines objects 104A are associated with first geofenced area 116A, objects 104B are associated with second geofenced area 116B, and objects 104C are associated with third geofenced area 116C.

Microcontroller 106 represents a small computing device on an integrated circuit (IC) chip capable of receiving data from sensors 114 and transmitting the data from sensors 114 to sensor configuration program 110 on server computer 102, via network 108. Microcontroller 106 can also be part of a system on a chip (SoC) on object 104, where the SoC integrates microcontroller 106 with other peripherals, such as, a communications module and a location module. In an Internet of Things (IoT) context, microcontroller 106 can collect data, sense, and actuate the physical world as an edge device. The location module of the SoC can utilize Global Positioning System (GPS), radio-frequency identification (RFID) triangulation, and/or cellular triangulation to determine a location of object 104 and can send, via the communication module, the location information to sensor configuration program 110 on server computer 102, via network 108. The location information can include GPS coordinates and/or a position in a structure (e.g., warehouse, manufacturing facility) based on a known floorplan. Sensors 114 represent a device capable of producing an output signal as a result of sensing a physical phenomenon and can include temperature sensors, pressure sensors, light sensors, chemical sensors, and biosensor.

In general, network 108 can be any combination of connections and protocols that will support communications between server computer 102 and objects 104A, 104B, and 104C. Network 108 can include, for example, a local area network (LAN), a wide area network (WAN), such as the internet, a cellular network, or any combination of the preceding, and can further include wired, wireless, and/or fiber optic connections. In one embodiment, sensor configuration program 110 can be a web service accessible via network 108 to an administrative user with an associated client device (not illustrated in FIG. 1). In another embodiment, sensor configuration program 110 may be operated directly by a user of server computer 102.

Sensor configuration program 110 determines a position for various objects 104 in an industrial setting and segments the various objects 104, where a first segment of the various objects 104 is represented at objects 104A, a second segment of the various objects 104 is represented at objects 104B, and a third segment of the various objects 104 is represented at objects 104C. Sensor configuration program 110 determines geofence areas for the segmented objects 104A, 104B, and 104C, where objects 104A are geofenced in a first area, objects 104B are geofenced in a second area, and objects 104C are geofenced in a third area. Sensor configuration program 110 determines the sensor configuration in each geofenced area, where the first area includes sensors 114A, the second area includes sensors 114B, and the third area includes sensors 114C. Subsequent to determining the sensor configuration for sensors 114A, 114B, and 114C, sensor configuration program 110 continuously monitors sensor configurations for each geofenced area and determines whether a new object 104 is present in a geofenced area. If sensor configuration program 110 determines a new object 104 is present in a geofenced area, sensor configuration program 110 determines whether a configuration is available for the new object in the geofenced area. If sensor configuration program 110 determines a new object 104 is not present in a geofenced area, sensor configuration program 110 determines whether a new sensor 114 is present in a geofenced area.

If sensor configuration program 110 determines a new sensor 114 is present in a geofenced area, sensor configuration program 110 determines whether a configuration is available for the new sensor in the geofenced area. If sensor configuration program 110 determines a new sensor 114 is not present in a geofenced area, sensor configuration program 110 determines whether any object 104 breached a geofenced area. If sensor configuration program 110 determines at least one object 104 has breached a geofenced area, sensor configuration program 110 determines whether a configuration is available for the at least one object 104 based on the breaching of the geofenced area. If sensor configuration program 110 determines at least one object 104 has not breached a geofenced area, sensor configuration program 110 determines whether a new configuration is available for any of sensors 114A, 114B, and 114C. If sensor configuration program 110 determines a new configuration is available for any of sensors 114A, 114B, and 114C, sensor configuration program 110 implements the new configuration and reverts to monitoring sensor configurations for each geofenced area. If sensor configuration program 110 determines a new configuration is not available for any of sensors 114A, 114B, and 114C, sensor configuration program 110 reverts to monitoring sensor configurations for each geofenced area. For determining whether a configuration is available for the new object 104, sensor 114, or at least one object 104 breaching of the geofenced area, sensor configuration program 110 performs the configuration is available or queries an administrator user for the configuration, if the configuration is not available.

Database 112 is a repository that stores various operational data from sensors 114A, 114B, and 114C, floorplans (e.g., manufacturing floor, warehouse floor), manufacturer operational specifications for each of objects 104A, 104B, and 104C, historical operational data for each of objects 104A, 104B, and 104C, maintenance history for each of objects 104A, 104B, and 104C, and any other data pertinent to sensor confirmation program 110 for managing sensor configuration based on geofencing of objects 104A, 104B, and 106C in an industrial setting. In the depicted embodiment, database 112 resides on server computer 102. A database is an organized collection of data, where database 112 can be implemented with any type of storage device capable of storing data and configuration files that can be accessed and utilized by service sensor configuration program 110, such as a database server, a hard disk drive, or a flash memory.

Figure 2:
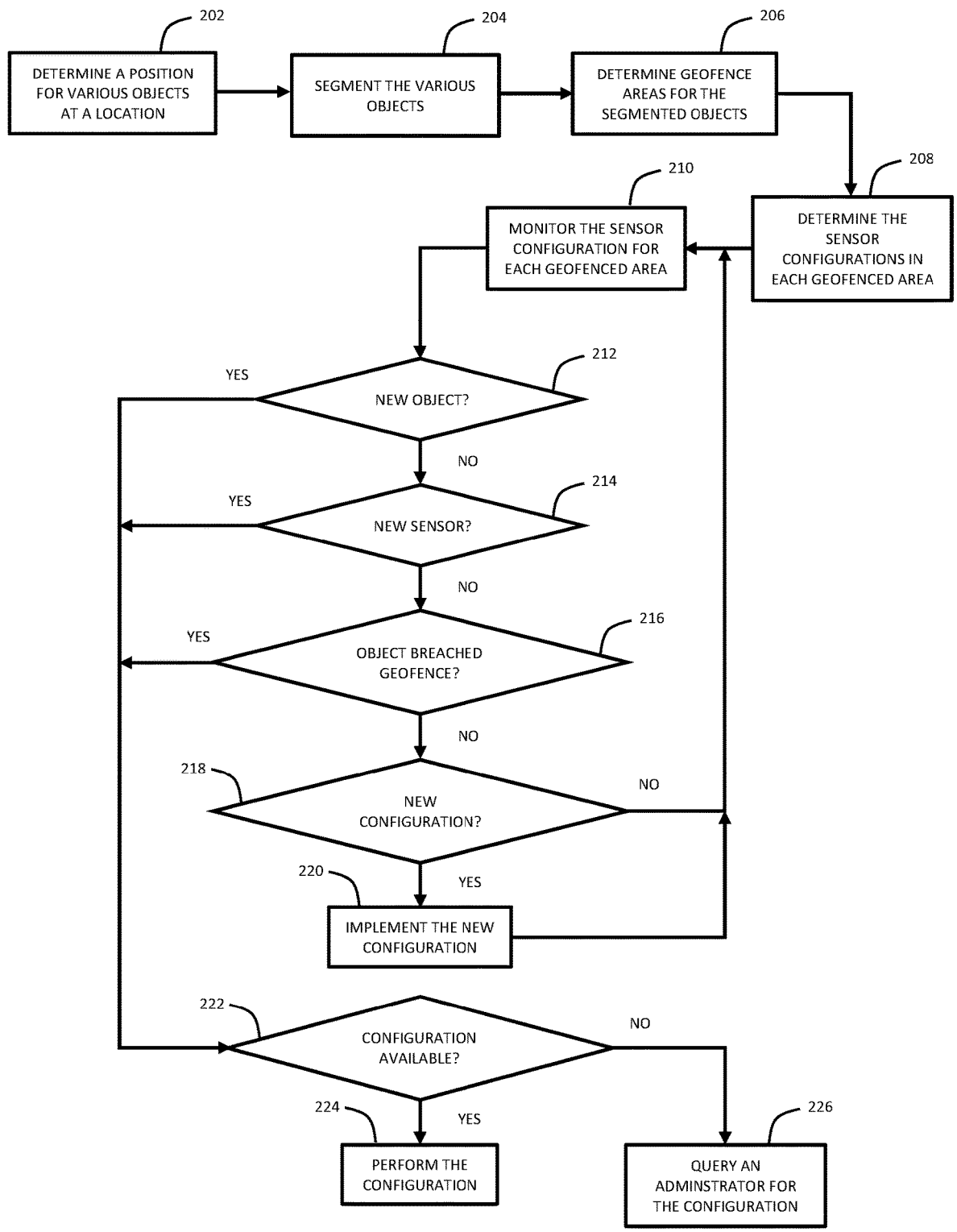
FIG. 2 is a flowchart depicting operational steps of a sensor configuration program for managing sensor configuration based on geofencing of objects in an industrial setting, in accordance with an embodiment of the present invention.

FIG. 2 is a flowchart depicting operational steps of a sensor configuration program for managing sensor configuration based on geofencing of objects in an industrial setting, in accordance with an embodiment of the present invention.

Sensor configuration program 110 determines a position for various objects at a location (202). For an industrial setting, such as a warehouse or manufacturing facility, sensor configuration program 110 determines a position for various machinery, electronic devices, and supporting infrastructure. Examples of machinery can include automated presses, power shears, snap-lock machines, and any other stationary or mobile industrial machinery with one or more electronic sensors capable of capturing operational data. Examples of electronic devices can include digital torque wrenches, power drills, digital scales, and any other device with one or more electronic sensors capable of capturing operational data to assist an individual with performing a task within the industrial setting. Examples of supporting infrastructure can include cooling systems and associated components (e.g., plumbing, pumps), HVAC systems and associated components (e.g., ducts, fans), and any other supporting infrastructure system or component with one or more electronic sensors capable of capturing operational data. In one embodiment, sensor configuration program 110 utilizes a local network positioning system to determine a position for various objects at the location based on a signal angle of arrival and a time of flight (ToF) for signals sent by the objects. In another embodiment, sensor configuration program 110 receives administrative user provided layout for an industrial setting, where the layout identifies each object in the industrial setting based on a placement on a warehouse floor or manufacturing facility floor. The administrative user provided layout for the industrial setting can also indicate whether each object is stationary or mobile, where the mobile objects further include an area of movement in addition to a position at the industrial setting.

Sensor configuration program 110 segments the various objects (204). Sensor configuration program 110 segments the various objects based on numerous parameters that include activities performable by each object from the various objects, a type of object (e.g., machinery, electronic device, supporting infrastructure) for each of the various objects, sensors installed on each of the various objects, and/or whether each of the various objects is stationary or mobile. For segmenting the various objects based on activities performable by each object from the various objects, sensor configuration program 110 identifies one or more activities performed by each object within the context of the industrial location. For example, sensor configuration program 110 segments a material packing rack, a conveyor system, a label printer, and a digital scale located in a warehouse facility based on activities performable by each object as relating to shipping and handling. The materiel packing rack and the conveyer system represent machinery and the label printer and the digital scale represent electronic devices. In another example, sensor configuration program 110 segments an electronic solder iron, a layout bench, wave solder machine, and an extraction fan in a manufacturing facility based on activities performable by each object as relating to soldering. The electronic solder iron represents an electronic device, the layout bench and extraction fan represent supporting infrastructure, and the wave solder machine represents machinery.

For segmenting the various objects based on a type of object for each of the various objects, sensor configuration program 110 segments subgroups of objects for each object type based on a sub-location or area (e.g., shipping, production, testing) of the location within the industrial setting. For segmenting the various objects based on sensors installed on each of the various objects, sensor configuration program 110 identifies one or more sensors on each object from the various objects and segments the various objects on similar sensors (e.g., temperature, pressure, light). For segmenting the various objects based on whether each of the various objects is stationary or mobile, sensor configuration program 110 segments the various objects based on stationary objects that have a fixed location or mobile objects that have a varying location as defined by a sub-location or area of the location within the industrial setting.

Sensor configuration program 110 determines geofence areas for the segmented objects (206). Within the industrial setting, sensor configuration program 110 determines a virtual perimeter (i.e., geofence) for each segment of the various objects, where the virtual perimeter defines an area for each segment of the various objects. Each of the virtual perimeters can be fixed, surrounding a segment of the various objects, or can be varying, surrounding one or more mobile objects in a segment of the various objects. In one example, sensor configuration program 110 segmented a material packing rack, a conveyor system, a label printer, and a digital scale located in a warehouse facility based on activities performable by each object as relating to shipping and handling. Sensor configuration program 110 determines the material packing rack and the conveyor system are fixed objects, whereas the label printer and the digital scale are varying objects, which can be moved by an individual. As a result, sensor configuration program 110 determines a geofence area for the segmented area that surrounds the fixed objects with an additional buffer area for movement of the varying objects with respect to the fixed objects. In another example, sensor configuration program 110 segmented an electronic solder iron, a layout bench, wave solder machine, an extraction fan, and an electronic mobile rack for moving printed circuit board assemblies, in a manufacturing facility based on activities performable by each object as relating to soldering. Sensor configuration program 110 determines the layout bench, the wave solder machine, and the extraction fan area stationary objects, whereas the electronic solder iron and the electronic mobile rack are varying objects, which can be moved by an individual. As a result, sensor configuration program 110 determines a geofence area that surrounds the fixed objects with an additional buffer area for movement of the varying objects with respect to the fixed objects. The additional buffer area includes a movement path for the electronic mobile rack between the layout bench and the wave solder machine.

Sensor configuration program 110 determines sensor configurations in each geofenced area (208). For each geofenced area, sensor configuration program 110 determines sensor configurations for each object from the segmented objects. As previously mentioned, each object includes a microcontroller and one or more sensors for capturing operational data for the object. For each object, sensor configuration program 110 identifies a type of sensor (e.g., temperature, pressure), an installation location for each sensor on the object, an installation type for each sensor (e.g., affixed with adhesive, a coupled module), a frequency of data collection for each sensor (e.g., 0.1 seconds), and a ping rate for each sensor at which data is transmitted (e.g., 1 second). Sensor configuration program 110 also determines one or more rules associated with a sensor configuration for each sensor with respect to other sensors located on the same object and/or other objects. For example, a temperature sensor on a first object is configured to collect data subsequent to a pressure sensor on the first object reaching a specified threshold. In another example, a pressure sensor on a first object is activated upon activation of a proximity sensor on a second object. Sensor configuration program 110 stores the sensor configurations, along with any defined rules, for each sensor on each object from the various objects.

Sensor configuration program 110 monitors the sensor configuration for each geofenced area (210). Sensor configuration program 110 monitors the sensor configuration for each geofence area based on data from each sensor that sensor configuration program 110 receives. Sensor configuration program 110 can monitor a frequency of data collection for each sensor and a ping rate for each sensor to ensure each sensor on each object in each geofenced area is configured correctly and collecting data according to the determined configurations. Any deviations (e.g., 5%) from the frequency of data collection for each sensor and/or the ping rate for each sensor indicates a possible fault for a specific sensor and required corrective action, such as replacing the specific sensor and/or object to resolve the sensor deviation.

Sensor configuration program 110 determines whether a new object is present in a geofenced area (decision 212). In event sensor configuration program 110 determines a new object is not present in a geofenced area ("no" branch, decision 212), sensor configuration program 110 determines whether a new sensor is present in a geofenced area (decision 214). In the event sensor configuration program 110 determines a new object is present in a geofenced area ("yes" branch, decision 212), sensor configuration program 110 determines whether a configuration is available for the object (decision 222). In one embodiment, sensor configuration program 110 determines whether a new object is present in a geofenced area based on the new object connecting to a local network at the location with the multiple geofenced area. Upon the new object establishing a connection to the local network, sensor configuration program 110 determines a location for the new object utilizing local network positioning system to determine the position for the new object at the location based on a signal angle of arrival and a time of flight (ToF) for a signal sent by the new object. Based on the position of the new object at the location, sensor configuration program 110 determines whether the position of the new object at the location is within a geofenced area, as previously determined in (206).

Sensor configuration program 110 determines whether a new sensor is present in a geofenced area (decision 214). In event sensor configuration program 110 determines a new sensor is not present in a geofenced area ("no" branch, decision 214), sensor configuration program 110 determines whether an object breached a geofenced area (decision 216). In the event sensor configuration program 110 determines a new sensor is present in a geofenced area ("yes" branch, decision 214), sensor configuration program 110 determines whether a configuration is available for the object (decision 222). In one embodiment, sensor configuration program 110 determines whether a new sensor is present in a geofenced area based on sensor configuration program 110 receiving data from the new sensor with metadata indicating a new sensor on an object at the location. The metadata includes a signature for the new sensor and sensor configuration program 110 can compare the metadata for the new sensor with metadata to all the sensors associated with the sensor configuration to determine that a new sensor is present in the geofenced area. Furthermore, sensor configuration program 110 can utilize the metadata for the new sensor to determine whether the new sensor is replacing an existing sensor, where sensor configuration program 110 no longer receives data and metadata for the existing sensor that is being replaced with the new sensor.

Sensor configuration program 110 determines whether an object breached a geofence area (decision 216). In the event sensor configuration program 110 determines an object did not breach a geofence area ("no" branch, decision 216), sensor configuration program 110 determines whether a new configuration is available for a sensor (decision 218). In the event sensor configuration program 110 determines an object breached a geofence area ("yes" branch, decision 216), sensor configuration program 110 determines whether a configuration is available for the object (decision 222). Sensor configuration program 110 determines whether an object breached a geofence area by determining a location for each object from the various objects utilizing local network positioning system to determine the position for each object at the location based on a signal angle of arrival and a time of flight (ToF) for a signal sent by the new object. If sensor configuration program 110 determines a location for an object is outside of a designated geofenced area, sensor configuration program 110 determines the object has breached a geofenced area.

Sensor configuration program 110 determines whether a new configuration is available for a sensor (decision 218). In the event sensor configuration program 110 determines a new configuration is available for a sensor ("yes" branch decision 218), sensor configuration program 110 implements the new configuration for the sensor (220). In the event sensor configuration program 110 determines a new configuration is not available for a sensor ("no" branch decision 218), sensor configuration program 110 reverts to monitoring the sensor configuration for each geofence area (210). Sensor configuration program 110 determines whether a new configuration is available for a sensor by identifying an alteration to an installation location, an installation type, a frequency of data collection, and/or a ping rate at which data is transmitted. Sensor configuration program 110 can utilize metadata associated with each sensor, a local network positioning system, and administrative user inputs to identify instance of alterations. Sensor configuration program 110 implements the new configuration for the sensor (220) by updating the sensor configuration for each sensor with an alteration and storing the alteration as a new sensor configuration for each sensor for subsequent monitoring.

Sensor configuration program 110 determines whether a configuration is available for the object (decision 222). In the event sensor configuration program 110 determines a configuration is available for the object ("yes" branch, decision 222), sensor configuration program 110 performs the configuration (224). In the event sensor configuration program 110 determines a configuration is not available for the object ("no" branch, decision 222), sensor configuration program 110 queries an administrator for the configuration (226).

Sensor configuration program 110 performs the configuration (224). Sensor configuration program 110 performing the configuration includes altering at least one of: an installation location for each sensor from the plurality of sensors, an installation type for each sensor from the plurality of sensors, a frequency of data collection for each sensor from the plurality of sensors, and a ping rate for each sensor from the plurality of sensors. In one embodiment, sensor configuration program 110 determines a configuration is available for a new object (e.g., conveyor system A) replacing an old object (e.g., conveyor system B) within a geofenced area, where one or more sensors on the new object are to be configured to according to a sensor configuration on the old object. Sensor configuration program 110 configures the sensors on conveyor system A according to the sensor configuration for the sensors on conveyor system B. In another embodiment, sensor configuration program 110 determines a configuration is available for a new object being placed into a geofenced area, wherein the new object matches an existing object in the geofence area based on a shared identifier (e.g., model number) between the two objects. Sensor configuration program 110 configures sensors on the new object according to the sensor configuration for the sensors on the existing object in the geofence area with the shared identifier. In yet another embodiment, sensor configuration program 110 determines a configuration is available for a new sensor replacing an existing sensor within a geofenced area, where the new sensor is to be configured according to a sensor configuration for the existing sensor. In yet another embodiment, sensor configuration program 110 determines a configuration is available for an object based on the object breaching a first geofenced area and entering a second geofenced area. Sensor configuration program 110 configures sensors on the object based on the object entering the second geofenced area.

Sensor configuration program 110 queries an administrator for the configuration (226). For instances where sensor configuration program 110 detects a new object, a new sensor, or an object breached a geofence area but a sensor configuration is not available, sensor configuration program 110 queries an administrator user to provide a configuration for the new object, new sensor, or the object that breached the geofenced area. Alternatively, sensor configuration program 110 can utilize a manufacturer default sensor configuration for the new object, new sensor, or the object that breached the geofenced area.

Figure 3:
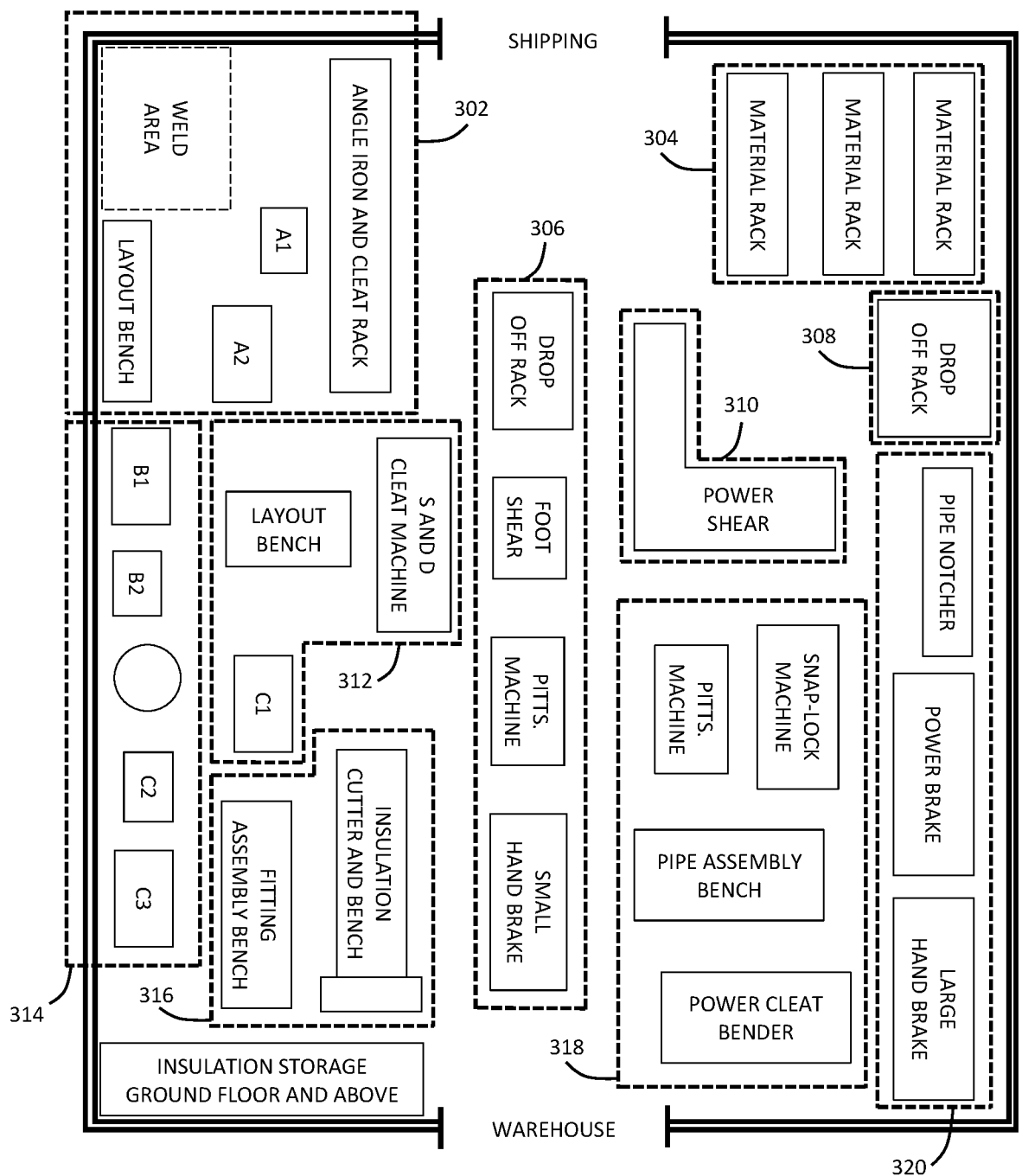
FIG. 3 illustrates an example of a geofencing of objects in an industrial setting for managing sensor configurations, in accordance with an embodiment of the present invention.

FIG. 3 illustrates an example of a geofencing of objects in an industrial setting for managing sensor configurations, in accordance with an embodiment of the present invention. In this example, sensor configuration program 110 determines a position for various objects in a portion of a manufacturing facility, segments the various objects, and determines geofences areas for the segmented objects. Sensor configuration program 110 determines geofenced areas 302, 304, 306, 308, 310, 312, 314, 316, 318, and 320 based on the segmented objects and determines the sensor configurations for each object for the various objects in geofenced areas 302-320. In one embodiment, sensor configuration program 110 determines a new power shear (i.e., new object) is present in geofenced area 310, where the new power shear with a common manufacturer model number is replacing the existing power shear. In response to determining a sensor configuration is available for the existing power shear, sensor configuration program 110 performs the sensor configuration on the new power shear replacing the existing power shear in geofenced area 310. In another embodiment, sensor configuration program 110 determines a new pressure sensor is present in geofenced area 320, where the new pressure sensor is replacing an old pressure sensor on a pipe notcher. In response to determining a sensor configuration is available for the new pressure sensor, sensor configuration program 110 performs the sensor configuration on the new pressure sensor on the pipe notcher located in geofenced area 320. In yet another embodiment, sensor configuration program 110 determines a material rack (i.e., object) has breached geofenced area 304, where the material rack is being relocated to geofenced area 302. In response to determining a sensor configuration is available for a material rack to be positioned in geofenced area 304, sensor configuration program 110 performs the sensor configuration on the material rack for being positioned in geofenced area 302 versus being positioned in geofenced area 304.

Figure 4:
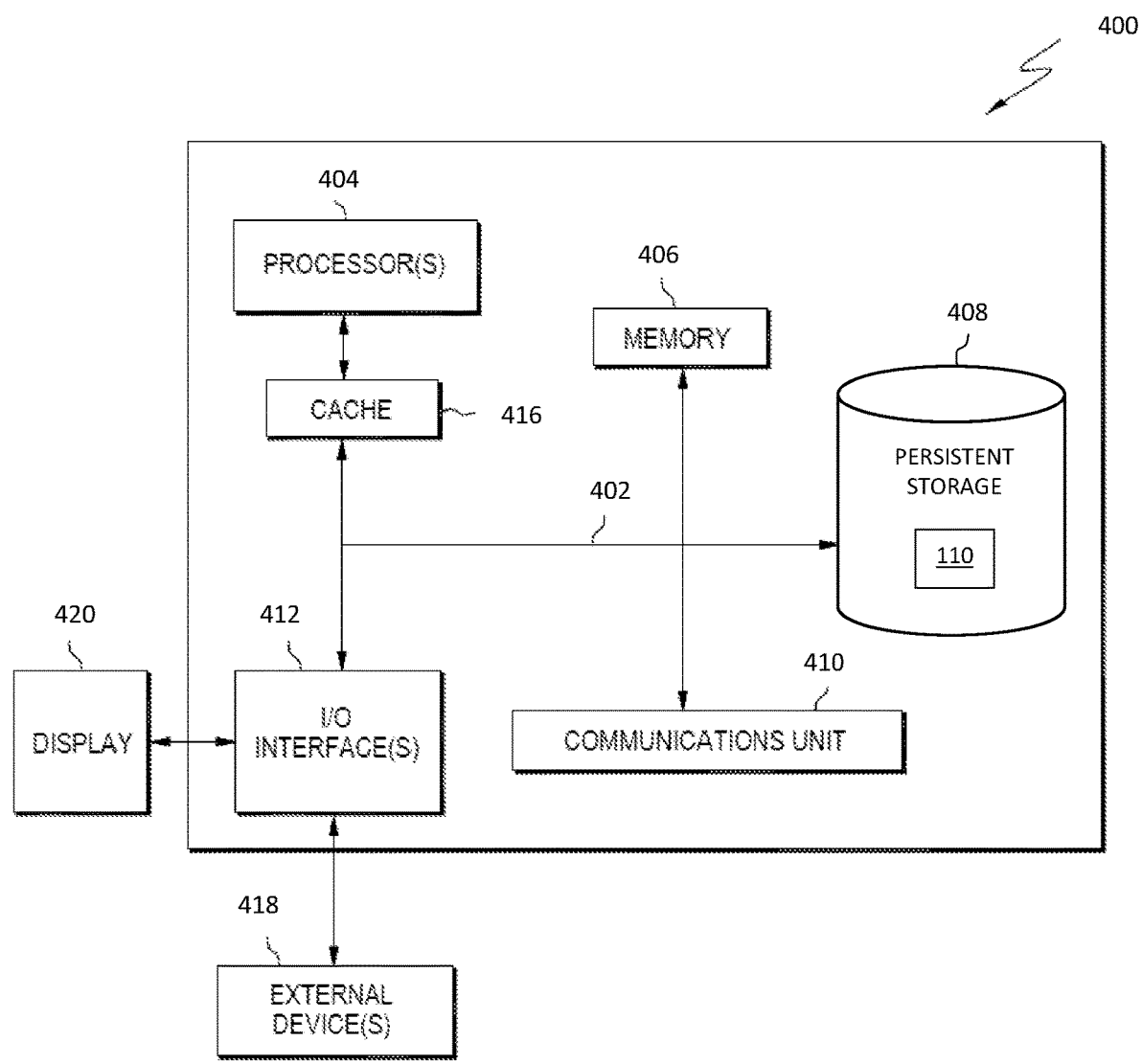
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes sensor configuration program 110. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
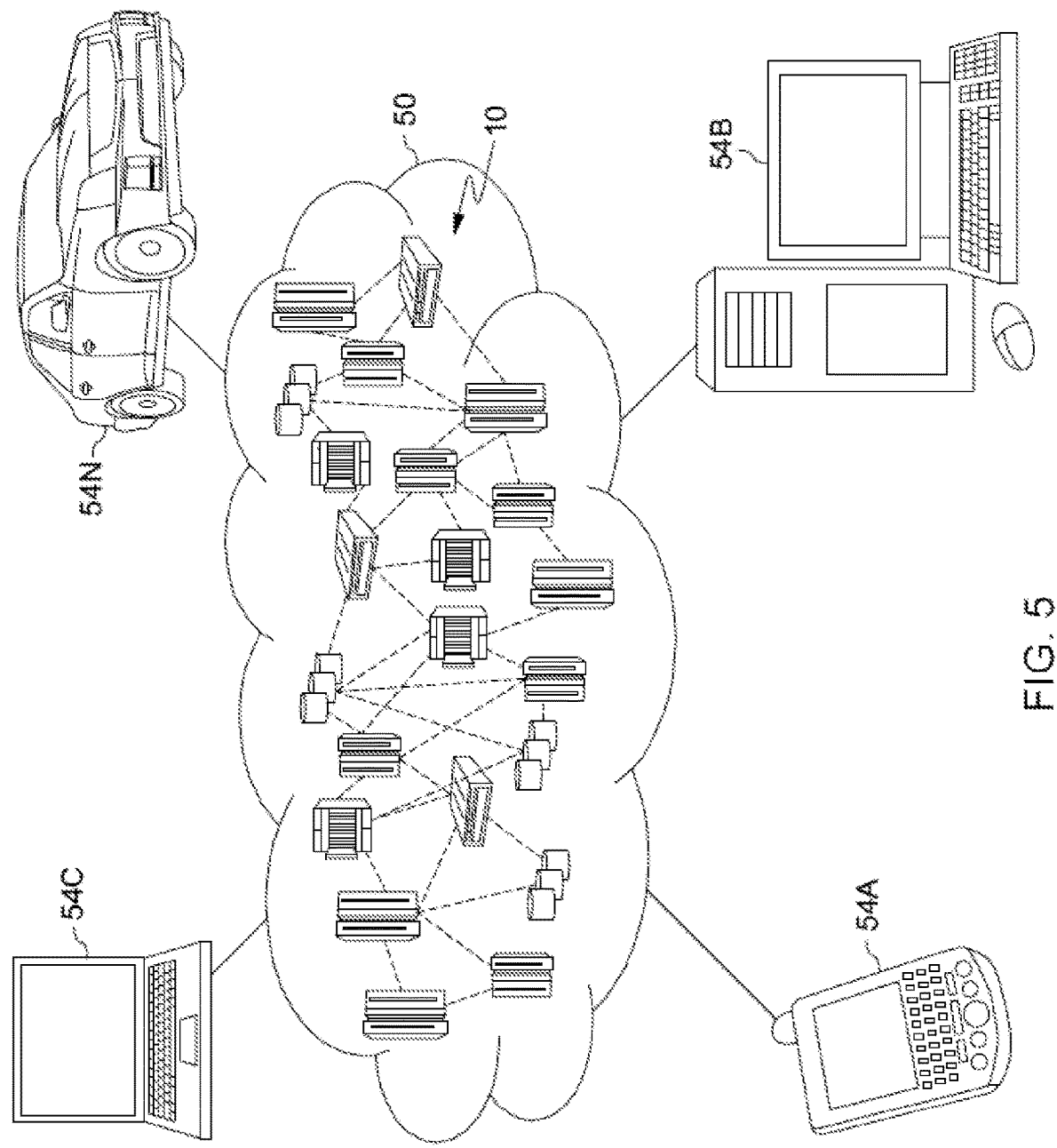
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
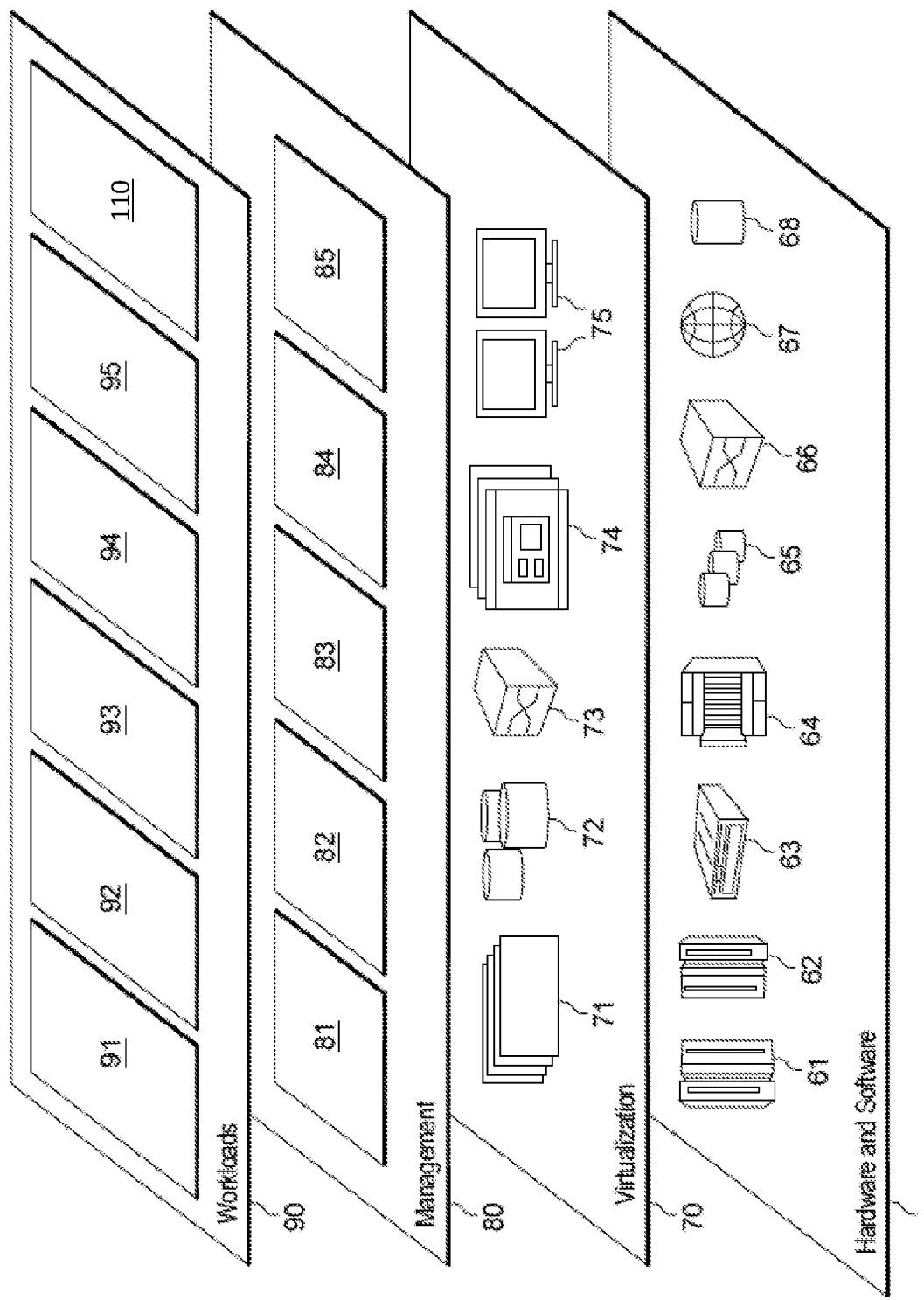
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor configuration program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    determining a position for each object from a plurality of objects within a location;
    segmenting the plurality of objects based on a plurality of parameters, wherein each parameter provides context to each object and at least one sensor on each object from the plurality of objects with respect to the location;
    determining a plurality of geofenced areas within the location for a plurality of segmentations of the plurality of objects, wherein each geofenced area from the plurality of geofenced areas within the location includes a segmentation from the plurality of segmentations of the plurality of objects;
    determining a plurality of sensor configurations for the plurality of objects based on the plurality of segmentations, wherein each sensor configuration is for the at least one sensor on each object from the plurality of objects;
    identifying an alteration to a first sensor configuration on a first object located in a first geofenced area within the location;
    updating sensor configurations for each sensor of each object located in the first geofenced area within the location based on the alteration to the first sensor configuration on the first object; and
    storing, as a new sensor configuration, the alteration to each sensor of each object located in the first geofenced area within the location.

2. The method of claim 1, wherein the plurality of parameters include: one or more activities performable by each object, a type of object for each object, the at least one sensor installed on each object, and whether the object is stationary.

3. The method of claim 1, further comprising:
    determining whether a new object is present in at least one geofenced area from the plurality of geofenced areas;
    responsive to determining the new object is present in the at least one geofenced area from the plurality of geofenced areas, determining whether at least one sensor configuration from the plurality of sensor configurations is available for the new object; and
    determining the first sensor configuration from the plurality of sensor configurations is available for the new object, wherein the first sensor configuration is associated with an action performable on the new object and the new object is the first object.

4. The method of claim 1, further comprising:
    determining whether a new sensor is present in at least one geofenced area from the plurality of geofenced areas;
    responsive to determining the new sensor is present in the at least one geofenced area from the plurality of geofenced areas, determining whether at least one sensor configuration from the plurality of sensor configurations is available for the new sensor; and
    determining the first sensor configuration from the plurality of sensor configurations is available for the new sensor, wherein the first sensor configuration is associated with an action performable on the new sensor.

5. The method of claim 4, wherein the new sensor is positioned on the first object from the plurality of objects.

6. The method of claim 1, further comprising:
    determining whether at least one object from the plurality of objects breached at least one geofenced area from the plurality of geofenced areas;
    responsive to determining the at least one object from the plurality of objects breached the at least one geofenced area from the plurality of geofenced areas, determining whether at least one sensor configuration from the plurality of sensor configurations is available for the at least one object; and determining the first sensor configuration from the plurality of sensor configurations is available for the at least one object, wherein the first sensor configuration is associated with an action performable on the at least one object.

7. The method of claim 1, wherein each sensor configuration from the plurality of sensor configurations includes a type of sensor for each sensor from a plurality of sensors, an installation location for each sensor from the plurality of sensors, an installation type for each sensor from the plurality of sensors, a frequency of data collection for each sensor from the plurality of sensors, and a ping rate for each sensor from the plurality of sensors.

8. A computer program product comprising:
one or more computer readable storage media; and
program instructions stored on the one or more computer readable storage media to perform operations comprising:
determining a position for each object from a plurality of objects within a location;
segmenting the plurality of objects based on a plurality of parameters, wherein each parameter provides context to each object and at least one sensor on each object from the plurality of objects with respect to the location;
determining a plurality of geofenced areas within the location for a plurality of segmentations of the plurality of objects, wherein each geofenced area from the plurality of geofenced areas within the location includes a segmentation from the plurality of segmentations of the plurality of objects;
determining a plurality of sensor configurations for the plurality of objects based on the plurality of segmentations, wherein each sensor configuration is for the at least one sensor on each object from the plurality of objects;
identifying an alteration to a first sensor configuration on a first object located in a first geofenced area within the location;
updating sensor configurations for each sensor of each object located in the first geofenced area within the location based on the alteration to the first sensor configuration on the first object; and
storing, as a new sensor configuration, the alteration to each sensor of each object located in the first geofenced area within the location.

9. The computer program product of claim 8, wherein the plurality of parameters include: one or more activities performable by each object, a type of object for each object, the at least one sensor installed on each object, and whether the object is stationary.

10. The computer program product of claim 8, wherein the operations further comprise:
determining whether a new object is present in at least one geofenced area from the plurality of geofenced areas;
responsive to determining the new object is present in the at least one geofenced area from the plurality of geofenced areas, determining whether at least one sensor configuration from the plurality of sensor configurations is available for the new object; and
determining the first sensor configuration from the plurality of sensor configurations is available for the new object, wherein the first sensor configuration is associated with an action performable on the new object and the new object is the first object.

11. The computer program product of claim 8, wherein the operations further comprise:
determining whether a new sensor is present in at least one geofenced area from the plurality of geofenced areas;
responsive to determining the new sensor is present in the at least one geofenced area from the plurality of geofenced areas, determining whether at least one sensor configuration from the plurality of sensor configurations is available for the new sensor; and
determining the first sensor configuration from the plurality of sensor configurations is available for the new sensor, wherein the first sensor configuration is associated with an action performable on the new sensor.

12. The computer program product of claim 11, wherein the new sensor is positioned on the first object from the plurality of objects.

13. The computer program product of claim 8, wherein the operations further comprise:
determining whether at least one object from the plurality of objects breached at least one geofenced area from the plurality of geofenced areas;
responsive to determining the at least one object from the plurality of objects breached the at least one geofenced area from the plurality of geofenced areas, determining whether at least one sensor configuration from the plurality of sensor configurations is available for the at least one object; and
determining the first sensor configuration from the plurality of sensor configurations is available for the at least one object, wherein the first sensor configuration is associated with an action performable on the at least one object.

14. The computer program product of claim 8, wherein each sensor configuration from the plurality of sensor configurations includes a type of sensor for each sensor from a plurality of sensors, an installation location for each sensor from the plurality of sensors, an installation type for each sensor from the plurality of sensors, a frequency of data collection for each sensor from the plurality of sensors, and a ping rate for each sensor from the plurality of sensors.

15. A computer system comprising:
a processor set;
one or more computer readable storage media; and
program instructions stored on the one or more computer readable storage media to cause the processor set to perform operations comprising:
determining a position for each object from a plurality of objects within a location;
segmenting the plurality of objects based on a plurality of parameters, wherein each parameter provides context to each object and at least one sensor on each object from the plurality of objects with respect to the location;
determining a plurality of geofenced areas within the location for a plurality of segmentations of the plurality of objects, wherein each geofenced area from the plurality of geofenced areas within the location includes a segmentation from the plurality of segmentations of the plurality of objects;
determining a plurality of sensor configurations for the plurality of objects based on the plurality of segmentations, wherein each sensor configuration is for the at least one sensor on each object from the plurality of objects;
identifying an alteration to a first sensor configuration on a first object located in a first geofenced area within the location;

updating sensor configurations for each sensor of each object located in the first geofenced area within the location based on the alteration to the first sensor configuration on the first object; and storing, as a new sensor configuration, the alteration to each sensor of each object located in the first geofenced area within the location.

16. The computer system of claim 15, wherein the plurality of parameters include: one or more activities performable by each object, a type of object for each object, the at least one sensor installed on each object, and whether the object is stationary.

17. The computer system of claim 15, wherein the operations further comprise:

determining whether a new object is present in at least one geofenced area from the plurality of geofenced areas;

responsive to determining the new object is present in the at least one geofenced area from the plurality of geofenced areas, determining whether at least one sensor configuration from the plurality of sensor configurations is available for the new object; and determining the first sensor configuration from the plurality of sensor configurations is available for the new object, wherein the first sensor configuration is associated with an action performable on the new object and the new object is the first object.

18. The computer system of claim 15, wherein the operations further comprise:

determining whether a new sensor is present in at least one geofenced area from the plurality of geofenced areas;

responsive to determining the new sensor is present in the at least one geofenced area from the plurality of geofenced areas, determining whether at least one sensor configuration from the plurality of sensor configurations is available for the new sensor; and determining the first sensor configuration from the plurality of sensor configurations is available for the new sensor, wherein the first sensor configuration is associated with an action performable on the new sensor.

19. The computer system of claim 18, wherein the new sensor is positioned on the first object from the plurality of objects.

20. The computer system of claim 15, wherein the operations further comprise:

determining whether at least one object from the plurality of objects breached at least one geofenced area from the plurality of geofenced areas;

responsive to determining the at least one object from the plurality of objects breached the at least one geofenced area from the plurality of geofenced areas, determining whether at least one sensor configuration from the plurality of sensor configurations is available for the at least one object; and determining the first sensor configuration from the plurality of sensor configurations is available for the at least one object, wherein the first sensor configuration is associated with an action performable on the at least one object.

* * * * *